United States Patent [19]

Garner

[11] Patent Number: 5,058,369
[45] Date of Patent: Oct. 22, 1991

[54] AUTOMATED DEVICE AND METHOD FOR HARVESTING PLANTS WITH UNIFORM STEM LENGTH

[76] Inventor: Frank D. Garner, Rte. 4, Box 92, Rupert, Id. 83350

[21] Appl. No.: 592,361

[22] Filed: Oct. 3, 1990

[51] Int. Cl.⁵ .................... A01D 23/04; A01D 34/66; A01D 45/30
[52] U.S. Cl. .................................. 56/13.9; 56/14.2; 56/14.3; 56/126; 56/157
[58] Field of Search .................... 56/13.9, 126, 121.42, 56/121.43, 121.46, 14.2, 14.5, 16.5, 327.1, 295, 119, 16.4, 157, DIG. 2, DIG. 20

[56] References Cited

U.S. PATENT DOCUMENTS

| | | | |
|---|---|---|---|
| 3,260,041 | 7/1966 | McRoberts et al. | 56/119 |
| 3,543,493 | 12/1970 | Duda, Jr. | 56/327.1 |
| 4,141,201 | 2/1979 | Christensen | 56/121.42 |
| 4,214,423 | 7/1980 | Dewey, Jr. | 56/130 |
| 4,250,697 | 2/1981 | Bray | 56/51 |
| 4,578,934 | 4/1986 | West et al. | 56/12.9 |
| 4,587,799 | 5/1986 | Thomas et al. | 56/14.6 |
| 4,942,727 | 7/1990 | Ginn | 56/126 |

Primary Examiner—Stephen J. Novosad
Attorney, Agent, or Firm—Thorpe North & Western

[57] ABSTRACT

A device and method for automated, mechanical harvesting of plants having differing heights and stem lengths, wherein a stem portion of the plant must be severed at a uniform, predetermined length from the top of the plant. The inventive method comprises the steps of (i) guiding the stems of the plants into a first severing blade (ii) severing a lower portion of the stems at an excess length to the free the plant from its root and form a precut stem length greater than the predetermined length required for the harvested plant, (iii) guiding the precut stem along a guide track toward a second severing blade which is positioned at a separation distance below the guide track which will cause severance of the stem at the predetermined length, (iv) vertically positioning the precut stem within the guide track such that the top of the plant is at a predetermined elevation with respect to the second severing blade, and (v) severing an additional portion of the stem from the plant by advancing the vertically positioned precut stem to the second severing blade to yield a harvested plant having a uniform, predetermined stem length. Structural components for implementing these steps are disclosed as well as the features of a conveyor belt useful for controlling stem movement, orientation and position displacement through the process.

33 Claims, 4 Drawing Sheets

AUTOMATED DEVICE AND METHOD FOR HARVESTING PLANTS WITH UNIFORM STEM LENGTH

BACKGROUND OF THE INVENTION

1. Field of the Invention

This invention relates to methods and devices for harvesting plants having differing heights and stem lengths to yield a harvested crop wherein each stem is severed at a uniform, predetermined length from the top of the plant. More particularly the present invention discloses a method and device for harvesting onion seed umbels to yield a umbel and attached stem of common length.

2. Prior Art

Although many years of mechanized farming has generated a substantial number of inventions for automating many areas of manual labor, there have remained several specific areas of agriculture technology which continue to require intense manual labor. One such area involves the harvesting of onion seed.

The onion seed crop is unique in several aspects. In addition to the fact that the growth cycle for the mature umbel or seed cluster is two years, specific harvesting requirements must be satisfied to ensure that the two year growth results in a sellable commodity. Specifically, the seed cluster or umbel forms atop a long stem whose length from root to cluster varies substantially. This seed cluster must be harvested several weeks prior to final maturity of the onion seeds. In order to ensure final maturation, the seed cluster or umbel is severed from the remaining plant with an attached stem length of approximately 4 inches. This severed plant is then subjected to a controlled drying environment. The attached segment of stem provides a moisture supply to complete the maturation of the onion seeds and ensure a sellable product within conventional marketing limitations.

Because each stem is of a different length conventional harvesting devices are not effective in onion seed agriculture. To apply such devices typically results in a cut of the stem at a uniform distance above the ground level, resulting in severed stem lengths at a variety of distances. Where such stem lengths are less than 4 inches, insufficient moisture will be supplied to the seeds. Stem length in excess of 4 inches results in poor seed quality because of increased moisture. The costly nature of such mistakes is readily apparent to the farmer who spends two years of cultivation and care to generate a final onion seed umbel which was ready for harvest.

As a consequence, conventional current commercial methods for harvesting onion seed rely on migrant workers who individually cut each stem at the appropriate 4 inch distance from the umbel, and place the umbel and stem in a harvest bin. Because the harvest must be accomplished within a very short time frame, the farmer is at the mercy of unpredictable work habits and ethics which can jeopardize two years of agricultural effort in generating the final crop. These unique circumstances combine to challenge the most careful planning of the onion seed farmer who must deal with these critical harvesting factors which are often beyond the farmer's control.

OBJECTS AND SUMMARY OF THE INVENTION

It is an object of the present invention to provide a device and method for enabling automated, mechanical harvesting of the onion seed umbel with appropriate stem length.

It is a further object of this invention to provide a method and device for generally harvesting plants whose fruit grows at a distal end of a stem which is to be cut at a predetermined length.

It is a further object of the present invention to provide an automated method for harvesting plants as described in the previous two paragraphs which is more economical and efficient than conventional manual labor techniques.

These and other objects are realized in a method for automated, mechanical harvesting of plants having differing heights and stem lengths wherein a stem portion must be severed at a uniform, predetermined length from the top of the plant. This method comprises the steps of (i) guiding the stems of the plant into a first severing means, (ii) severing a lower portion of the stems at an excess length at the first severing means to free the plant from its root while leaving a precut stem length greater than the predetermined length of the harvested plant, (iii) guiding the precut stem along a guide tract toward a second severing means which is positioned at a separation distance below a top level of the guide track which will cause severance of a stem at the predetermined length of the stem from the top of the plant, (iv) vertically positioning the stem within the guide track such that the top of the plant is at a predetermined elevation with respect to the second severing means prior to severance of the stem at the predetermined length, and (v) severing an additional portion of the stem from the plant by advancing the vertically positioned, precut stem to the second severing means to yield a harvested plant having a uniform, predetermined length.

This method is implemented with a device which includes (i) guide means for guiding the stems of the plants into the first severing means, (ii) first severing means positioned behind the guide means for severing a lower portion of the stem at the stated excess length, (iii) a guide track extending from the guide means and operable to guide the stems toward a second severing means which will cause severance of the stem at the predetermined length, (iv) positioning means disposed below the track guide and being operable to vertically position the precut stem within the guide track such that the top of the plant is at a predetermined elevation with respect to the second severance means, and (v) second severing means coupled below the guide track and being operable to sever an additional portion of the stem from the plant by advancing the vertically positioned, precut stem to the second severing means.

Other objects and features of the present invention will be apparent to those skilled in the art in view of the following detailed description, taken in combination with the accompanying drawings.

DETAILED DESCRIPTION OF THE INVENTION

Figure 1:
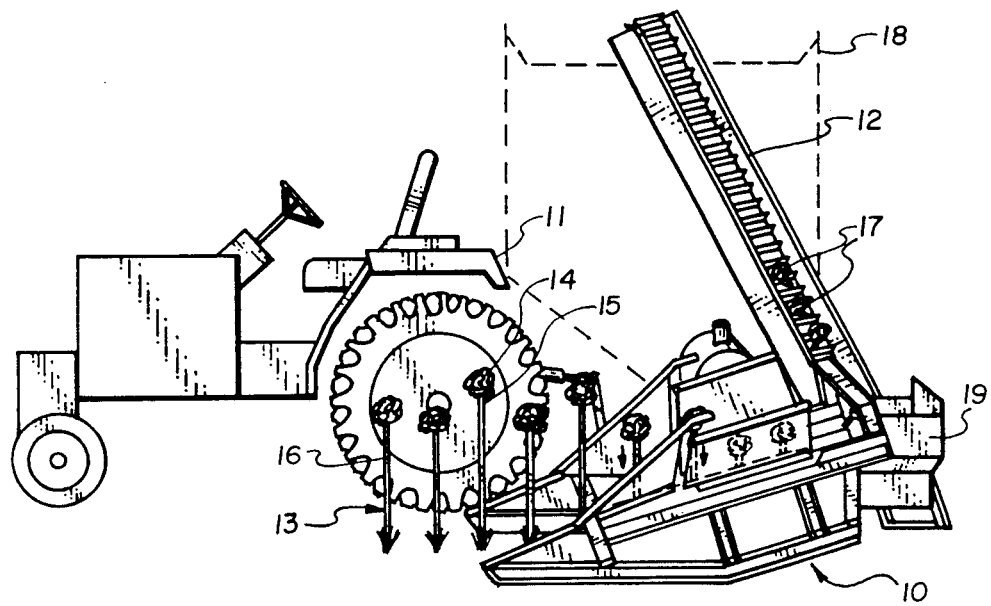
FIG. 1 shows a perspective, side view of a row of onion seed plants being harvested in accordance with the method of the present invention.

Referring now to the drawings:

FIG. 1 illustrates one embodiment wherein the present invention 10 is coupled to conventional farm equipment such as tractor 11 and conveyor 12. This embodiment is adapted to advance along a row of plants, such as the onion seed plant illustrated as item 13. As was noted in the prior art discussion, these plants are characteristic of plants which have fruit or other desired product 14 formed at the top or distal end 15 of a stem 16. The present inventive device and method harvest the fruit 14 by severing the stem 16 at a distance of approximately 4 inches below the seed-head or cluster comprising the specific fruit of the referenced onion seed plant 13. This seed head or umbel is shown in its harvested form 17 as it is being transported along conveyor 12 from a hopper 19 for collection in a storage bin 18. All aspects of the harvesting method are automated and require no manual assistance in realizing the final harvested product 17.

The method of harvesting onion seed, or similar plants, is accomplished by first orienting the device 10 along a row of plants 13 to be harvested. These plants 13 are guided into the converging fingers 20 and 21 of opposing conveyor belts 22 and 23. These respective belts 22 and 23 rotate around drive wheels 24 and 25 in opposing directions and converge to cradle the stem 26 gently between the respective fingers 20 and 21. The rate of rotation or movement of the respective drive belts and projecting fingers is coordinated with the relative velocity of the device 10 with respect to the ground. By matching ground speed with the rate of movement for the respective belts 22 and 23, the stems 26 are stabilized between the respective belts until the plant is severed near ground level by a first rotating blade 30.

Figure 2:
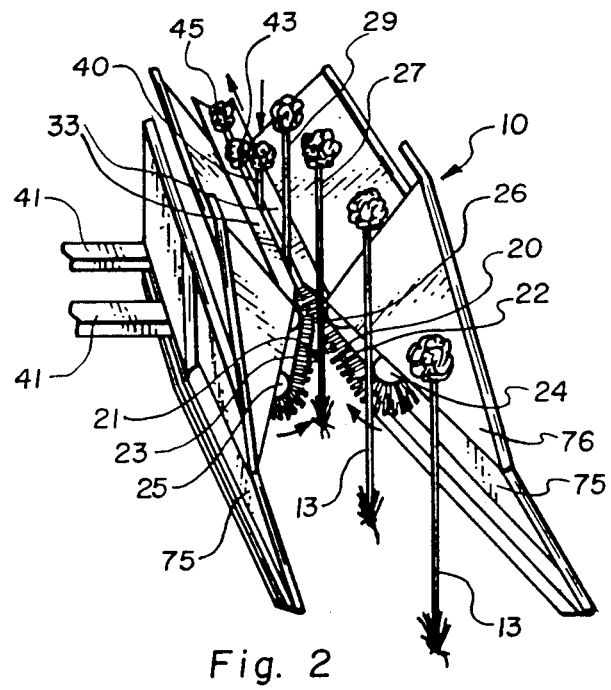
FIG. 2 shows a frontal view of the device disclosed herein for receiving and harvesting the onion seed stem and attached umbel or seed-head.
Figure 4:
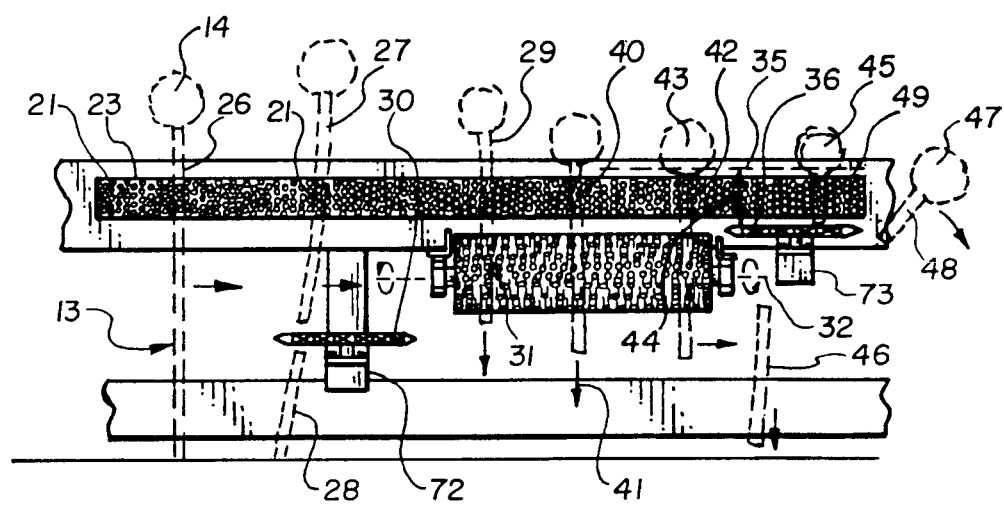
FIG. 4 is a cross section of the structure of FIG. 3, along the lines 3—3, including illustration of the process of severing the stem at an appropriate stem length.

The procedure of severing the stem 13 and umbel 14 from the rooted plant will be more readily understood by viewing FIG. 4, which provides a schematic illustration of the process. As was discussed with respect to FIG. 2, the plant is guided into the receiving fingers 21 of the conveyor belt 23. The specific plant identified as item 26 is illustrated making initial contact at these fingers in FIG. 4. The preceding plant 27 has already advanced to the cutting blade 30, severing the upper stem 27 from the rooted stem 28. Because the upper stem 27 is cradled within the fingers 21 of the conveyor system, its position remains at its original elevation. Its progress rearward is caused by the advancing conveyor belt and cradling fingers 21.

A preceding plant 29 has already been severed by the same process and is continuing its rearward advancement by virtue of movement of the referenced conveyor belt and fingers 21. This preceding plant has now been engaged by a second conveyor belt 31 whose axis of rotation 32 is parallel with the direction of movement of the first conveyor belt 23. This second conveyor belt 31 operates as a positioning means below a track guide 33 (see FIGS. 2 and 3). This positioning means or conveyor belt 31 operates to vertically position the precut stem 29 such that the top of the plant is at a predetermined elevation 35 with respect to a second rotating blade or severing means 36.

The desired downward movement of the stem 31 arises by virtue of a gentle, downward frictional force applied by the flexible fingers to pull the precut stem 29 and urge the stem downward within a slot 37 formed the pair of guide tracks 33. For example, stem 40 continues to be urged downward 41 by virtue of the frictional force applied by the fingers 31 of the rotating conveyor belt. Stem 42 has reached a limiting position by reason of the obstruction caused by the upper faces of the guide track pair 33, representing the predetermined elevation shown by broken line 35. This line, representing the faces of the pair of guide track members 33 blocks further downward movement of the stem by resisting against the pressure arising from the seed-head or umbel 43. It should be noted that the top level of the conveyor belts 22 and 23 may also serve or provide the predetermined elevation 35 and resistance in the absence of separate guide members 33. This is discussed hereafter.

At this stage, umbel 43 is properly positioned in elevation with respect to the guide tracks 33. The stem 42 of this umbel 43 is prepared to encounter the second rotating blade 36 which will sever the stem at the predetermined length (for example, 4 inches). This action can be seen with respect to umbel 45 which has been severed from its lower stem 46 and is now ready for transport to the storage bin 18. Umbel 47 with proper stem length 48 are illustrated in the mode of falling to a hopper 19 for carriage or conveyor belt 12 to such a storage bin 18.

This sequence of harvesting can be represented generally by the following steps which constitute the general method of the subject invention. These steps include the initial guiding of stems of the plants to a first severing means 30 which cuts the stem at an excess length to free the plant 27 from its root 28, yet leave a precut stem length greater than the predetermined length (4 inches) of the harvested plant. These precut stems are guided along a guide track 33 or at a top level of the conveyor belts toward a second severing means 36 which is positioned at a separation distance 44 below the guide track which will cause severance of the stem at the predetermined length as the precut stem passes along this guide track. To realize proper positioning, the stem which has been precut or initially severed from its root 28 is carried within the guide track and vertically positioned such that the top of the plant 43 is at a predetermined elevation 35 with respect to the second severing means 36 prior to severance of the stem at the predetermined length. Upon severance at the blade 36, the umbel 45 and stem 49 are in the final harvested configuration.

Figure 3:
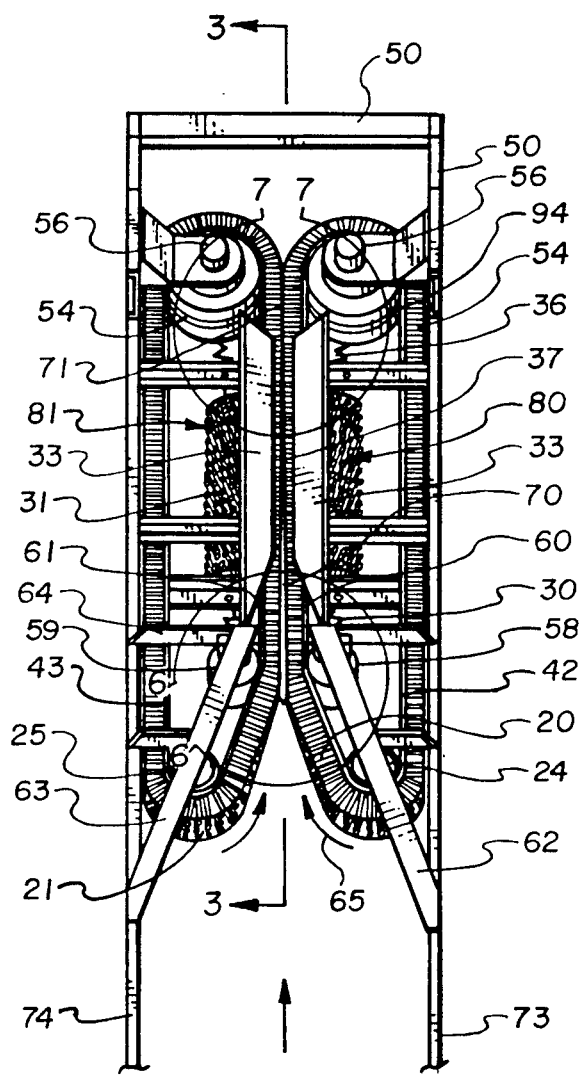
FIG. 3 is a top, perspective view of the moving components for positioning the stem at a desired elevation for harvesting.

A more detailed discussion of the structure will assist in understanding the inventive methods employed in connection with this onion seed harvester. FIG. 3 illustrates the basic construction of the operating components. It includes a frame 50 which provides a mounting support for the operative hardware which is bounded by the frame 50. It also provides a point of attachment for braces 41 (FIG. 2) which enable coupling of the device to a tractor or other means of conveyance.

Four operative components form the moving parts of the system. A first pair of conveyor belts 42 and 43 provide for the horizontal movement of the severed plant as it passes between the guide tracks 33 and along the track slot 37. All belts 42 and 43 are driven by a pair of drums or drive wheels 54. These drive wheels are powered by a conventional hydraulic drive system 56, as are the rotating blades 30 and 36 and other belt driven systems. The second pair of drive wheels 24 and 25 maintain the respective belts 42 and 43 in tension and are of free wheeling nature. A third set of drive wheels 58 and 59 displaced the forward end of the respective belts into a converging configuration to receive incoming plants, and to align the respective belt segments 60 and 61 in parallel orientation. These respective forward drive wheels 24, 25, 58 and 59 are supported on brace members 62 and 63. These braces 62 and 63 are secured at forward positions on frame 50 and rearward positions on an intermediate brace 64 which also provides a mounting position for the pair of guide tracks 33. The function of other mounting braces within the frame work as shown in FIG. 3 will be apparent to those skilled in the art and needs no further explanation. The rotation direction of the respective conveyor belts 42 and 43 is shown by directional arrows 65.

The length of the guide track 33 and continuous slot 37 is a function of the displacement distance between the first severing means or blade 30 and the second blade 36. As illustrated in FIG. 3 this guide track extends from a forward receiving end 70 positioned above the first severing means 30, to a rearward, dispensing end 71 positioned above the second severing means 36. The respective support guides 33 making up the guide track pair define the continuous slot 37, whose width or separation difference is sufficiently large that stems of plants to be processed can travel along the slot in unimpeded movement both in vertical and horizontal directions. As will be explained later, the support guides 33 of the guide track function to limit downward movement of the plant by blocking downward displacement of the umbel or seed-head beyond the upper face of the support guides 33 (see umbels 43 and 45 in FIG. 4). In the absence of guide members 33, the respective belts 42 and 43 define the slot which is traversed by the stems, with the projecting fingers providing support for the stem and umbel.

The respective first and second severing means are illustrated in the figures as a rotating blade with a sawtooth cutting edge around the periphery of the rotating disk. It will be apparent to those skilled in the art that other forms of severing means may be applied with equal effectiveness, including such configurations as rotating straight blades and reciprocating shear blades. The choice of particular blade will depend upon the nature of the plant and stem to be severed. The blade positions illustrated in FIG. 4 may be adjusted by displacement of the support brace 72 for the first severing blade 30 or 73 for the second severing blade 36.

Forward projecting arms 73 and 74 operate as the guide means for guiding the stems of the plants into the first severing blade 30. They also form a support base for channeling plates 75 and 76 which function to protect or shield the operating hardware as well as guide plants toward the receiving end of the device. Typically, these forward projecting arms 73 and 74 will diverge outward and are configured to gather plants into alignment for advancement into the track guide.

As has been previously explained, as plant and stem are received at the device opening and encounter the first cutting blade 30, the plant is then severed and subsequently displaced downward by the second pair of positioning belts 80 and 81, which includes finger projections 31 as described in connection with FIG. 4. This pair of belts 80 and 81 are generally described as force application means because they provide a gentle, downward force at the stem to urge the stem to a uniform height with respect to the second severing blade 36. For this reason, these belts 80 and 81 are disposed immediately below the slot 37 of the guide track so that the stem is received within the projecting fingers of each belt 80 and 81. By adjusting the projecting fingers 31 of the respective belts 80 and 81 to gently contact the traversing stem, a slight frictional force is applied which tends to drag the stem downward without damaging the seed head or umbel of the plant. Upon contact of the umbel of the plant with an upper surface of the guide track 33, the applied frictional force from the respective belts 80 and 81 is overcome by the resistance of the umbel against further movement by virtue of encountering the support guides 33 of the guide track or top of the conveyor belts. At this stage (illustrated by stem 42 in FIG. 4) the applied force from the fingers 31 of the rotating belt are merely gliding past the stem, maintaining its desired elevation 35 along the guide track 33.

Figure 5:
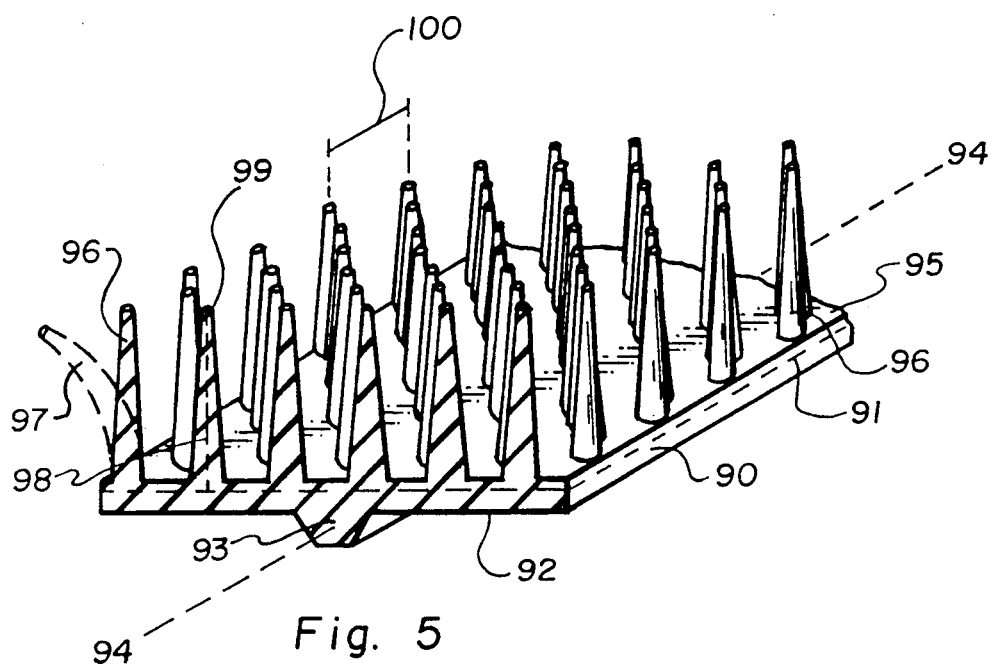
FIG. 5 is a perspective view of a segment of conveyor belt used to cradle the stem of the plant and transport the plant along the processing system.

FIG. 5 illustrates a segment of belt as used in the horizontal conveyor belt system 42 and 43 and is similar in design to the type of belt with projecting fingers as is used with the positioning belts 80 and 81. This belt includes a base support 90 which comprises an elongate support plate having an operating surface 91 and a drive surface 92 at an opposite side from the operating surface 91. This drive surface may include a notch guide 93 which provides for centering on a drive wheel such as drive wheels 54 and having a guide channel 94. This notch guide 93 extends along a central, elongate axis 94 of the belt.

The operating surface 91 has an attached sheet of flexible polymer 95 which is bonded to the operating surface at one side, and includes a plurality of contiguous rows of finger projections 96 at the remaining side. Typically, these finger projections 96 would be fabricated as a uni-body structure with the sheet of polymer 95. This polymer sheet with finger projections may be fabricated of a well known composition referred to as scrubber rubber or may be of other material which meets the requirements of size and flexibility as set forth in the following paragraph.

Because the flexible fingers operate to cradle the stem within a gentle grasp, each flexible finger 96 must be capable of readily deflecting 97 in response to contact with the stem or other portion of the plant. This prevents the finger from seriously damaging the stem and enables the belt to firmly hold the stem in position as it traverses the respective cutting blades. The modulus of elasticity and deflection coefficients for the projecting fingers 96 illustrated in FIG. 5 are approximated by the well known scrubber rubber composition, which has shown to be effective as a suitable material for the present invention. It will be apparent to those skilled in the art that numerous other polymers could provide the desired flexibility to satisfy the deflection requirements outlined herein.

The preferred embodiments illustrated in the accompanying figures shows a conveyor belt having finger projections which extend at least one inch in length from the operating surface of the belt and which are separated by no more than two inches. As shown in the drawings, the flexible fingers are configured with a truncated, trapezoidal cross-section along each elongate central axis 98 with each finger having its larger diameter positioned at the operating surface 91 and the most narrow diameter 91 at an unconnected, distal end of the finger 99. The actual dimensions of these fingers in this specific example are approximately $\frac{3}{8}$ inch at the base diameter, $\frac{1}{4}$ inch at the top diameter 99 and a height of approximately $1\frac{1}{4}$ inches. Adjacent projected fingers are separated by $\frac{1}{2}$ inch from center to center 100. With respect to application to onion seed plants, a preferred length of projecting finger would range between 1 to 2 inches.

Figure 6:
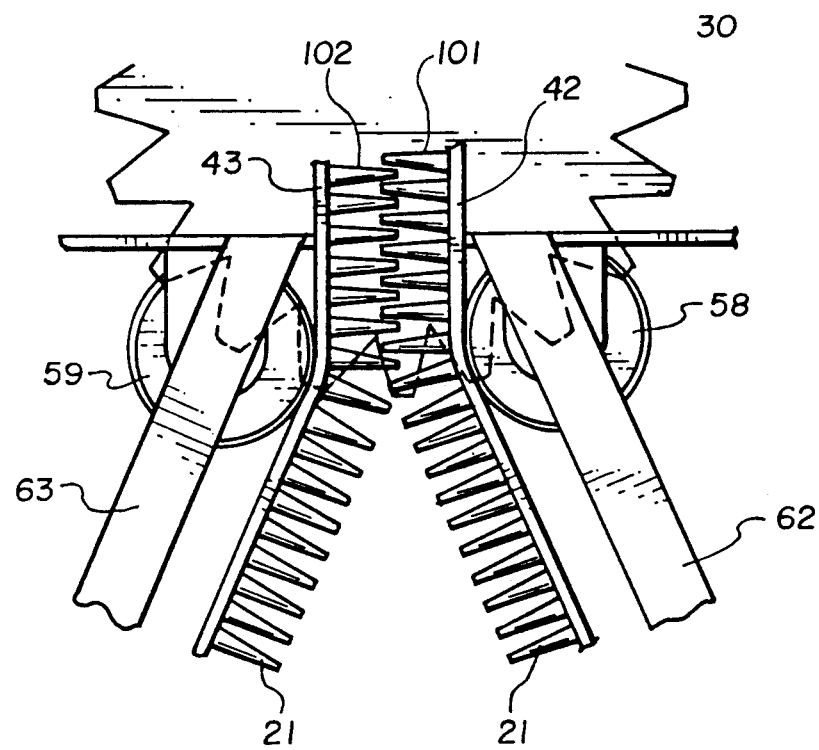
FIG. 6 illustrates the cooperative interdigitation of the conveyor belts within the circular sector identified by the arcuate line 6—6.
Figure 7:
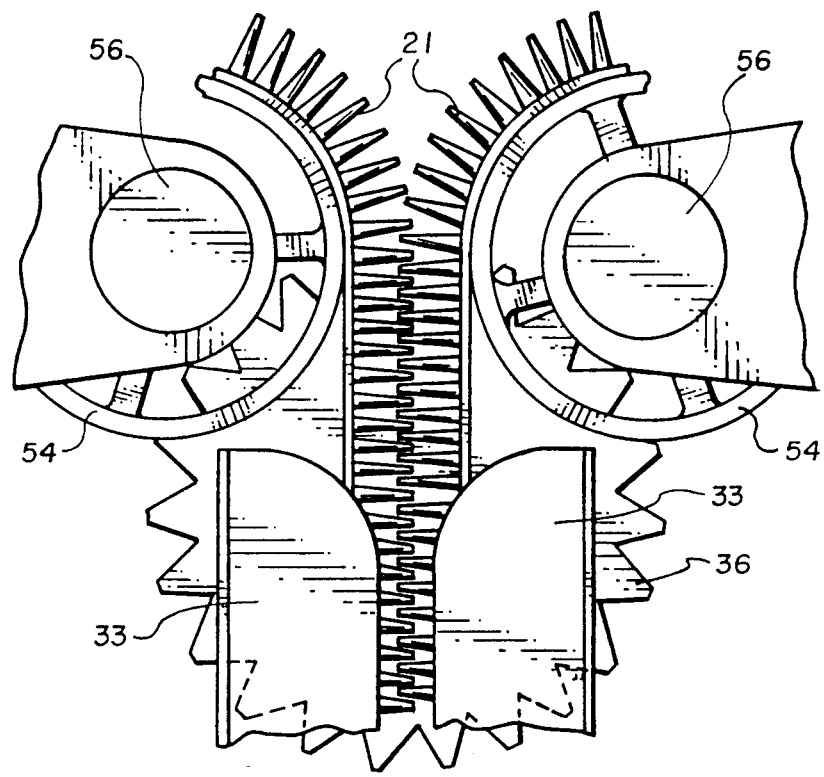
FIG. 7 shows a segmented plan view of the rearward part of the conveyor and processing system as enclosed by the arcuate line 7—7.
Figure 8:
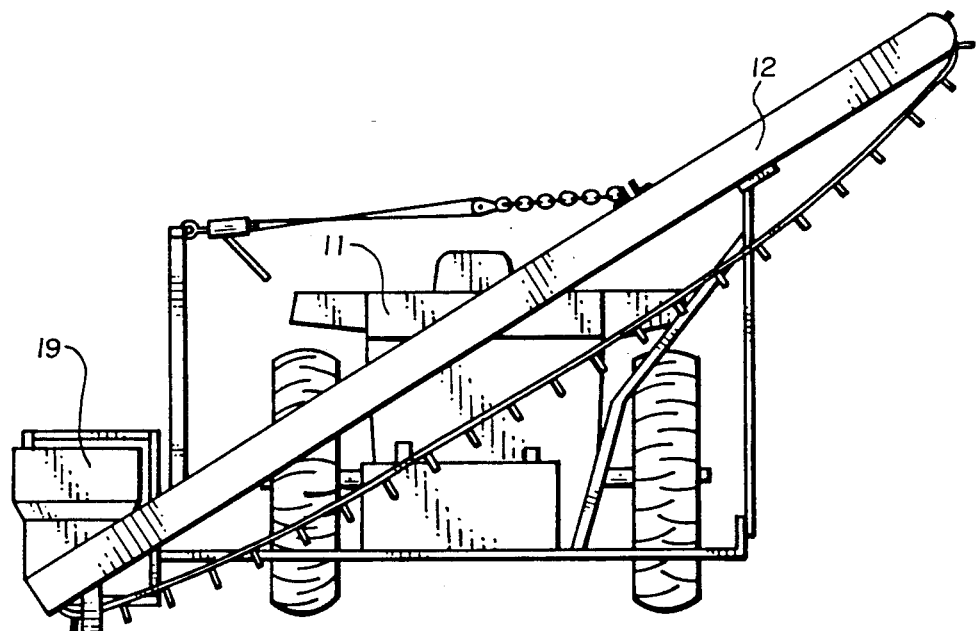
FIG. 8 provides a rearward, plan view of the inventive device attached to a tractor and loading conveyor.

When provided with sufficient flexibility to enable the projected fingers to deflect out of the path of a plant or stem, the respective belts can be brought into a juxtaposed position as illustrated, with the respective fingers being in interdigitating relationship 101 and 102 as illustrated in FIGS. 6 and 7. A benefit of such interdigitation of multiple rows of projecting fingers is to fully cradle the stem in three dimensions within the grasp of projecting fingers from opposing belts 42 and 43. Such secure positioning is important in view of the impact force of the cutting blade 30 as it severs the plant from its root. FIG. 7 illustrates the continued interdigitation of the respective finger projections 21 at a rearward end of the device where the second rotating blade 36 makes the final cut to provide proper stem length as was illustrated as item 44 in FIG. 4.

Similar interdigitation of the projecting fingers 31 on the positioning belts 80 and 81 is provided here again, these projecting fingers 31 and accompanying belt structure are positioned in juxtaposed relationship with the projecting fingers 31 of the first belt and attached rotating drum being separated by a distance which allows interdigitation of the finger tips to a degree which provides the gentle downward frictional force against the stem as it passes along the guide track. Such interdigitation extends up to approximately one-half inch in configurations wherein the finger projections are positioned in an orthogonal relationship to the belt surface. It will be apparent to those skilled in the art that other belt configurations with fingers projecting in non-orthogonal relationship can be applied with respect to the present invention, depending upon the desired results and degree of force to be applied during the processing stage.

It will be apparent to those skilled in the art that the foregoing description of specific embodiments and examples is provided for illustration purposes and is not intended to limit the scope of the claims which accompany this disclosure. For example, numerous variations to the specific structure are contemplated and are believed to be comprehended within the legal scope of the claims. A significant aspect of the general inventive principles set forth in this disclosure include the use of horizontal and vertical transport systems which enable vertical positioning of a plant to a predetermined level for severance of the stem. These principles are generally represented by the use of a horizontal advancement means such has been illustrated as the pair of conveyor belts 42 and 43. This horizontal advancement means generally refers to the drive system which is activated to rotate the belts and attached finger projections along the rotational path shown in the drawings. This general advancement system also includes forced application means which comprise the projecting fingers 21 which are disposed immediately below the slot of the guide track 33. In the horizontal system, this forced application means provides a gentle force at the stem to urge the stem along the guide track from the first to the second severing blade. The drive wheel system for support of this horizontal conveyor belt requires that the rotational axis for each drive wheel be in a vertical orientation or approximately at an orthogonal relationship with respect to the horizontal path of movement. Although two rotating belts are disclosed, it is feasible that a single belt could be utilized to accomplish the inventive principles with somewhat less effectiveness than the preferred embodiment. Accordingly, both single belt systems and juxtaposed belt pair systems are contemplated within the present invention.

In contrast with the horizontal system, the vertical positioning system involves rotating drums which have a rotational axis parallel with the direction of movement of the plants to be processed through this system. This relationship of the drums, belts 80 and 81 and projecting fingers 31 has already been discussed. Here again, a single rotating drum with projecting fingers may be applied with less effectiveness than the disclosed dual belt system. By operating the latter pair of conveyor belts to provide vertical displacement in combination with the horizontal displacement of the first pair of conveyor belts, a single process of elevational adjustment is accomplished, resulting in severance at a uniform stem length for the onion seed or other plants having similar umbel type harvest requirements. These respective horizontal and vertical transport systems facilitate the required automation for adjusting umbel height with respect to the second cutting blade. This integrated system is adaptable for use with common farm equipment such as a tractor 11 and conveyor loaders 12. Specific details with respect to attachment, hardware and power transfer systems to operate the subject invention will be known and understood by those having skill in this particular field of art, based on the inventive features disclosed herein.

I claim:

1. A method for automated, mechanical harvesting of plants having differing heights and stem lengths, wherein a stem portion of the plant must be severed at a uniform, predetermined length from the top of the plant, said method comprising the steps of:

(1.1) guiding the stems of the plants into a first severing means;

(1.2) severing a lower portion of the stems at an excess length at the first severing means to free the plant from its root yet leave a precut stem length greater than the predetermined length of the harvested plant;

(1.3) guiding the precut stem along a guide track toward a second severing means which is positioned at a separation distance below a top level of the guide track which will cause severance of the stem at the predetermined length of the stem from the top of the plant as the precut stem passes along the guide track;

(1.4) vertically positioning the precut stem within the guide track such that the top of the plant is at a predetermined elevation with respect to the second severing means prior to severance of the stem at the predetermined length; and (1.5) severing an additional portion of the stem from the plant by advancing the vertically positioned, precut stem to the second severing means to yield a harvested plant having a uniform, predetermined stem length.

2. A method as defined in claim 1, wherein the listed steps are applied by a harvesting device which cuts the plants of variable height to a predetermined uniform stem length in accordance with the following specific steps:

(2.1) orienting the device along a row of plants to be harvested;

(2.2) activating means for vertically positioning precut stems to a proper elevation with respect to the second severing means;

(2.3) advancing the device along the row to sequentially engage the stems at the first severing means and within the guide track;

(2.4) severing the stems at the first severing means to form precut stems;

(2.5) positioning the precut stems to the predetermined elevation;

(2.6) advancing the precut stems to the second severing means to sever the stems to the predetermined length.

3. A method as defined in claim 2, comprising the more specific steps of:

(3.1) forming a guide track within the device which extends in advance of the first severing means and beyond the second severing means;

(3.2) attaching a first conveyor belt to horizontal drive means for providing horizontal displacement to the conveyor belt for engaging and transporting the stem along the guide track from the first severing means to the second severing means;

(3.3) attaching a second conveyor belt to vertical drive means for engaging and transporting the stem to the predetermined elevation prior to severance of the stem at the second severing means; and (3.4) activating both the horizontal and vertical drive means to displace the respective conveyor belts as the device is advanced along the row of plants.

4. A method as defined in claim 3, comprising the more specific steps of:

(4.1) attaching a first conveyor belt having a plurality of projecting, flexible fingers which are positioned to engage the stem of the plant to be harvested without causing injury to the plant, said belt being attached to the horizontal drive means; and (4.2) attaching a second conveyor belt having a plurality of projecting, flexible fingers which are positioned to engage the stem of the plant to be harvested without causing injury to the plant, said belt being attached to the vertical drive means; and (4.3) activating both the horizontal and vertical drive means to displace the respective conveyor belts as the device is advanced along the row of plants.

5. A method as defined in claim 4, comprising further steps of:

(5.1) attaching a first pair of conveyor belts having a plurality of projecting, flexible fingers which are positioned in juxtaposed relationship with the flexible fingers projecting toward fingers of the other belt pair to engage the stem of the plant to be harvested without causing injury to the plant, said first pair of belts being attached to the horizontal drive means; and (5.2) attaching a second pair of conveyor belts having a plurality of projecting, flexible fingers which are positioned in juxtaposed relationship with the flexible fingers projecting toward fingers of the other belt pair to engage the stem of the plant to be harvested without causing injury to the plant, said second pair belts being attached to the vertical drive means; and (5.3) activating both the horizontal and vertical drive means to displace the respective pairs of conveyor belts as the device is advanced along the row of plants.

6. A method as defined in claim 5, comprising the further step of interdigitating the opposing fingers of the respective pairs of conveyor belts to provide for secure engagement of the stems of the plants to be harvested.

7. A method as defined in claim 1, wherein the steps are applied as part of a method for harvesting onion seed plants having seed-bearing heads, said method comprising the specific steps of:

(7.1) guiding the stems of the plants into a first severing means;

(7.2) severing a lower portion of the stems at an excess length at the first severing means to free the plant from its root yet leave a precut stem length greater than the predetermined length of the harvested plant;

(7.3) guiding the precut stem along a guide track toward a second severing means which is positioned at a separation distance below a top level of the guide track which will cause severance of the stem at the predetermined length of the stem from the seed-bearing head of the plant as the precut stem passes along the guide track;

(7.4) vertically positioning the precut stem within the guide track such that the seed-bearing head of the plant is at a predetermined elevation with respect to the second severing means prior to severance of the stem at the predetermined length; and (7.5) severing an additional portion of the stem from the plant by advancing the vertically positioned, precut stem to the second severing means to yield a harvested plant having a uniform, predetermined stem length.

8. A method as defined in claim 7, comprising the more specific step of vertically positioning the precut stem within the guide track such that the seed-bearing head is vertically supported by a top level of the guide track, thereby preventing vertical displacement of the seed-bearing head below the guide track.

9. A method as defined in claim 8, comprising the more specific steps of:

(9.1) forming the guide track as a slot dimensioned to pass stems of the onion seed plant, but being sufficiently narrow to obstruct passage of the seed-bearing head;

(9.2) applying a gentle, downward pull to the precut stem to urge the stem downward within the slot of the guide track until the seed-bearing head engages the guide track; and (9.3) adjusting the relative height of the second severing means with respect to the guide track such that the separation distance therebetween is approximately equal to the predetermined length desired for the harvested onion seed plant.

10. A method as defined in claim 1, further comprising the step of conveying the harvested plant with predetermined stem length to a receiving bin.

11. A device for automated, mechanical harvesting of plants having differing heights and stem lengths, wherein a stem portion of the plant must be severed at a uniform, predetermined length from the top of the plant, said device comprising:

(11.1) guide means for guiding the stems of the plants into a first severing means;

(11.2) first severing means positioned behind the guide means for severing a lower portion of the stems at an excess length at the first severing means to free the plant from its root yet leave a precut stem length greater than the predetermined length of the harvested plant;

(11.3) a guide track extending from the guide means and operable to guide the stems toward a second severing means which is positioned at a separation distance below the guide track which will cause severance of the stem at the predetermined length of the stem from the top of the plant as the precut stem passes along the guide track;

(11.4) positioning means disposed below the track guide and being operable to vertically position the precut stem within the guide track such that the top of the plant is at a predetermined elevation with respect to the second severing means prior to severance of the stem at the predetermined length; and (11.5) second severing means coupled below the guide track and being operable to sever an additional portion of the stem from the plant by advancing the vertically positioned, precut stem to the second severing means to yield a harvested plant having a uniform, predetermined stem length.

12. A device as defined in claim 11, wherein the harvesting device further comprises:

(12.1) mechanical transport means for moving the device along a row of plants to be harvested;

(12.2) said guide means including forward projecting arms which diverge outward and are configured to gather plants into alignment for advancement into the guide track.

13. A device as defined in claim 12, wherein the guide track comprises a pair of support guides separated by a continuous slot, said guide track extending from a forward, receiving end positioned above the first severing means to a rearward, dispensing end positioned beyond the second severing means, said continuous slot having a width greater than the width of stem portions of the plant which travel along the slot to permit unimpedded movement of the stem in both vertical and horizontal directions.

14. A device as defined in claim 13, wherein the first severing means comprises a rotating blade positioned below the guide track such that each stem passing along the guide track encounters the rotating blade and is severed from its root.

15. A device as defined in claim 14, wherein the severing means comprises a rotating disk having a peripheral, sawtooth blade which is substantially continuous around the disk.

16. A device as defined in claim 13, wherein the second severing means comprises a rotating blade positioned below the guide track near the dispensing end.

17. A device as defined in claim 11, wherein the positioning means comprises force application means disposed immediately below the slot of the guide track, said force application means being configured to apply a gentle, downward force at the stem to urge the stem to a uniform height with respect to the second severing means.

18. A device as defined in claim 17, wherein the force application means comprises a rotating belt having a belt surface which contacts the stem and applies a friction force directed downward which tends to drag the stem downward without damaging the top of the plant until the top of the plant encounters a top level of the guide track.

19. A device as defined in claim 18, wherein the belt surface includes a plurality of small, flexible, finger projections which are configured to apply the downward frictional force against the stem as it passes along the guide track.

20. A device as defined in claim 19, wherein the finger projections are positioned orthogonal to the surface of the belt and deflect away from the stem as the stem is encountered by the fingers.

21. A device as defined in claim 20, wherein the belt with attached projecting fingers is supported on a first rotating drum which is positioned with its rotational axis in approximate alignment with the guide track.

22. A device as defined in claim 21, wherein the device includes a second rotating drum and mounted belt with projecting fingers positioned in juxtaposed relationship with the projecting fingers of the first drum and belt and being separated by a distance which causes the stem passing along the guide track between the respective drums to be engaged on each side of the stem by the flexible fingers.

23. A device as defined in claim 22, wherein the juxtaposed fingers of the respective belts interdigitate when the fingers are not deflected.

24. A device as defined in claim 11, wherein the guide track includes horizontal advancement means with force application means disposed immediately below the slot of the guide track, said force application means being configured to apply a gentle, forward force at the stem to urge the stem along the guide track toward the second severing means.

25. A device as defined in claim 24, wherein the force application means comprises a horizontal rotating belt having an horizontal belt surface which contacts the stem and applies a friction force directed forward along the guide track which tends to advance the stem forward along the guide track without damaging the top of the plant.

26. A device as defined in claim 25, wherein the horizontal belt surface includes a plurality of small, flexible, finger projections which are configured to apply the forward advancing frictional force against the stem as it passes along the guide track.

27. A device as defined in claim 26, wherein the finger projections are positioned orthogonal to the surface of the belt and deflect away from the stem as the stem is encountered by the fingers.

28. A device as defined in claim 27, wherein the horizontal belt with attached projecting fingers is supported on a first vertical, rotating drum which is positioned with its rotational axis in approximate perpendicular alignment with the guide track.

29. A device as defined in claim 28, wherein the device includes a second vertical, rotating drum and mounted belt with projecting fingers positioned in juxtaposed relationship with the projecting fingers of the first vertical drum and belt and being separated by a distance which causes the stem passing along the guide track between the respective drums to be engaged on each side of the stem by the flexible fingers.

30. A device as defined in claim 29, wherein the juxtaposed fingers of the respective vertical belts interdigitate when the fingers are not deflected.

31. A device as defined in claim 11, further comprising:
 (31.1) a first pair of horizontal transport means supported below the guide track;
 (31.2) a first pair of conveyor belts supported on the respective transport means and having a plurality of projecting, flexible fingers which are positioned in juxtaposed relationship with the flexible fingers projecting toward fingers of the other belt pair to engage the stem of the plant to be harvested without causing injury to the plant, said first pair of belts being attached to the horizontal transport means; and
 (31.3) a second pair of conveyor belts having a plurality of projecting, flexible fingers which are positioned in juxtaposed relationship with the flexible fingers projecting toward fingers of the other belt pair to engage the stem of the plant to be harvested without causing injury to the plant, said second pair of belts being attached to vertical transport means; and
 (31.4) a power source for activating both the horizontal and vertical drive means to displace the respective pairs of conveyor belts as the device is advanced along the row of plants.

32. A device as defined in claim 11, configured for harvesting onion seed plants having seed-bearing heads, wherein the second severing means is positioned at a separation distance below the guide track which will cause severance of the stem at a predetermined length of approximately four inches below the seed-bearing head of the plant as the precut stem passes along the guide track.

33. A device as defined in claim 32, wherein the guide track is configured such that the seed-bearing head is vertically supported by the guide track as the plant advances along the guide track, supporting the seed-bearing head in response to the downward force of the positioning means.

* * * * *